R. C. LANPHIER.
METHOD OF OPERATING ALTERNATING CURRENT MERCURY WATTMETERS.
APPLICATION FILED FEB. 9, 1906.
927,733.
Patented July 13, 1909.
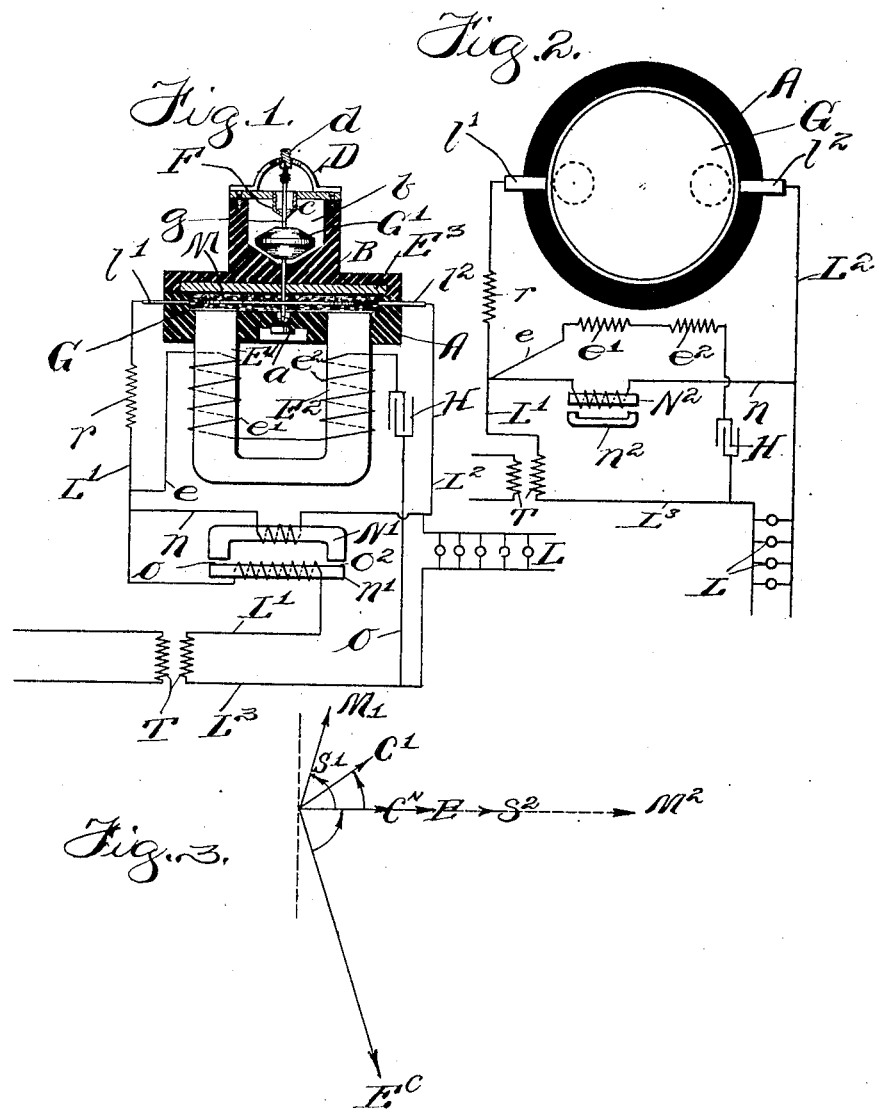

UNITED STATES PATENT OFFICE.

ROBERT C. LANPHIER, OF SPRINGFIELD, ILLINOIS, ASSIGNOR TO SANGAMO ELECTRIC COMPANY, OF SPRINGFIELD, ILLINOIS, A CORPORATION OF ILLINOIS.

METHOD OF OPERATING ALTERNATING-CURRENT MERCURY WATTMETERS.

No. 927,733.  Specification of Letters Patent.  Patented July 13, 1909.

Application filed February 9, 1906. Serial No. 300,307.

*To all whom it may concern:*

Be it known that I, ROBERT C. LANPHIER, a citizen of the United States, residing at Springfield, county of Sangamon, State of Illinois, have invented certain new and useful Improvements in the Method of Operating Alternating-Current Mercury Wattmeters, of which the following is a full and complete specification, reference being had to the accompanying drawings.

My invention relates to motor mercury watt-meters for measuring alternating currents of electricity, and particularly to motor watt-meters of the mercury type in which the armature, preferably in the form of a disk, is immersed in mercury and is caused to rotate by the interaction of the load current or an aliquot portion thereof passing across the disk or across a portion thereof and a magnetic field energized by a derived or shunt current; and its object is to provide a new and improved method of operating mercury motor watt-meters by an alternating current.

Heretofore, it has been common to operate mercury motor meters by a direct current of electricity. Generally speaking, such meters contain a chamber formed of or surrounded by non-magnetic material, and adapted to contain mercury. In this mercury, an armature, connected, of course, with usual registering mechanism, is completely submerged. The load current to be measured, or a definite aliquot part thereof, enters the mercury chamber by suitable contact, and, passing through the mercury and across the armature, or across a portion of the armature, passes out of the mercury chamber by another contact and thence to the circuit and the translating devices. The poles of a magnet, suitably placed, enter the chamber in close proximity to the armature, and said magnet is energized to produce a magnetic field reacting with the load current by energizing coils which are in derived relation, or in shunt relation, to the main load current, or to the current passing through the disk and mercury chamber. Such a meter for direct currents is shown, for example, in Letters Patent of the United States to Mr. Gutmann and myself, No. 738,902, granted Sept. 15, 1903. In this meter, the armature consists of a copper disk immersed in a body of mercury and exposed to a strong magnetic field, the arrangement being such that the main current traverses the disk diametrically, while the shunt circuit passes through the energizing coils of the magnetic field, whereby the disk is rotated. The principles upon which that meter operates are well-known, and need not be described here.

Heretofore, I believe, no integrating watt-meter of this type has been devised to measure an alternating current. If an alternating current be passed through the main load and energizing windings of such a meter, the great self-induction produced by the alternating currents in the shunt energizing coil causes the phases of the currents in said energizing coil—and therefore the phases in the said magnetic field—to lag behind the phases of the current in the main load circuit so much that the field produced by said coils will have a difference of phase from the impressed E. M. F. of some seventy degrees or more. As a result of this difference in phase, the meter has almost no torque upon a non-inductive load, and with an inductive load it has a torque which will gradually increase as the power factor of the load decreases and the load current thereby comes more nearly in phase with the lagging magnetic field.

It is the object of my invention to provide a new and improved method by which a watt-meter of this type may be operated by an alternating current, and, broadly speaking, my new and improved method consists in sending the main load current, or some definite aliquot portion thereof through the mercury chamber and disk, in energizing the magnetic field by an alternating current of the same frequency as the main load current in derived relation therewith, and in bringing the alternating current which energizes the magnetic field and the magnetic field into zero phase relation with the impressed E. M. F. By this means the polarity of the magnetic field alternates with the same frequency as the alternations of the main load current and at the same time therewith, causing the armature to rotate.

I have shown in the drawings one form of apparatus by which my new and improved method may be carried out.

In the drawings:—Figure 1 is principally diagrammatic, but in which parts are shown in vertical section; Fig. 2 is a view showing the mercury cup and disk in plan and the coöperating parts diametrically; and Fig. 3 is a vector diagram.

Similar reference characters are used to designate similar parts in the several figures of the drawing.

Reference letter A indicates a mercury cup formed of any suitable insulating material.

B designates a cover for the mercury cup, also made of insulating material, which is provided with a chamber $b$.

C designates a cap for closing the top of chamber $b$.

A disk G of good conducting material, such as copper, is immersed in the mercury M in the cup A.

$g$ designates a vertical spindle extending concentrically through the disk G and to which the latter is affixed. The lower end of the spindle $g$ is tapered and rests upon a conical bearing $a$, the latter being conveniently made in the form of a screw which is inserted in an opening through the bottom of the mercury cup. The portion of the spindle which extends upwardly through the chamber $b$ has fixed thereon a counterweight G′ while the upper end of the spindle is tapered and engages a conical bearing $d$, the latter being preferably formed as a screw supported by a yoke D mounted upon the cap C. A thimble F depends from the cap C and concentrically surrounds the spindle $g$ thereby preventing the escape from the chamber $b$ of any mercury which may flow thereinto from the mercury cup when the latter occupies any other position than a vertical one.

E′ and E² indicate the poles of a magnet which extend through the bottom wall of the mercury cup A.

E³ designates the return path for the magnetic lines, which is preferably formed of laminated metal and is supported within the cover B diametrically across the disk G.

$l'$ and $l^2$ indicate conductor terminals which extend through the mercury cup in the same horizonal plane as the disk G and at diametrically opposite points.

L′ designates one line of the power circuit which is connected to the terminal $l'$ while L² designates a continuation of the line extending from the terminal $l^2$ and connecting with any suitable translating apparatus such as indicated at L. L³ indicates the return line extending from the translating apparatus L. The lines L′ and L³ are connected in any suitable manner either from a dynamo or from a transformer such as indicated at T.

$e$ indicates a shunt circuit leading from the line L′ to the line L³ and comprising the energizing coils $e'$ and $e^2$ which surround the cores E′ and E² of the magnet. Located in series with the coils $e'$ and $e^2$ and interposed between the same and the line L³ is a condenser H.

A shunt circuit $n$ which includes an inductive resistance extends from the line L′ to line L². The inductive resistance indicated in Fig. 1 consists in a core N′, the winding of which is in the shunt circuit $n$, and a core $n'$ the energizing coil around which is connected in the main line L′. The core N′ may preferably be formed of laminated metal and the poles thereof are spaced apart from the core $n'$ so as to form small air gaps $o'$ and $o^2$. In Fig. 2 the inductive resistance in the shunt circuit $n$ is shown as consisting in a choke coil, the poles of the core N² of which are located adjacent to the ends of a yoke $n^2$.

$r$ indicates a non-inductive resistance in the main line between the shunt $n$ and the terminal $l'$ to cause a portion of the current to pass through the shunt around the disk G until the inductive resistance in the shunt increases sufficiently to cause practically all of the current to pass through the disk.

F designates a worm on the spindle $g'$ by means of which the rotary motion of the disk G is communicated to any suitable registering mechanism.

The operation of my invention is as follows: The alternating current passes from the dynamo or transformer T through the line L′ non-inductive resistance $r$, terminal $l'$, disk G, terminal $l^2$, line L² to the translating apparatus L, thence through the return line L³ to the dynamo or transformer. A portion of the current proportional to the line voltage also passes through the shunt circuit $e$, windings $e'$ and $e^2$ of the magnetic field, condenser H to the return line L³. The reaction of the magnetic field upon the disk G rotates the latter and the rotation thereof is recorded upon suitable registering apparatus operatively connected to the worm F in any usual or well-known manner. The condenser H impresses an electro-motive force on the coils $e'$ and $e^2$ thereby bringing the magnetic field produced by them in phase with the line pressure on non-inductive load. The lagging of the current in the coils $e'$ and $e^2$ due to their self-induction is thereby overcome so that the difference in phase between the impressed E. M. F. and the magnetic field is eliminated. By properly adjusting the self-induction and capacity of the system any desired phase of the magnetism in the shunt field may be obtained and such adjustment may be conveniently accomplished by using fixed coils and a variable condenser, so that the meter may be readily adjusted to measure correctly either a non-inductive or an inductive load to the lowest possible factor. The condenser not only impresses upon the shunt coils an E. M. F. in advance of the line pressure, but also increases the potential across the coils of the magnetic field so that the strength of the field is much greater than that obtained by connecting them directly across the original line without the employment of a condenser. It has been found in practice that with a 100 volt 60 cycle circuit the condenser raises the pressure at least three or four times.

The operation above described is graphically illustrated in the vector diagram in Fig. 3, in which E indicates the impressed line pressure; $C^n$ the main current on non-inductive load; $C'$ the main current on inductive load; $S'$ the shunt current through the coils $e'$ and $e^2$, lagging 80 degrees when the shunt is connected across the circuit; $M'$ the magnetic field of the shunt, the phase of which is that of the shunt current $S'$; $E^c$ the pressure impressed on the shunt coils $e'$ and $e^2$ when the condenser is used, the phase being 80 degrees in advance of and greater than that of the line pressure E; $S^2$ the current in the shunt coils due to $E^c$, the pressure impressed by the condenser; and $M^2$ the magnetism which is in phase with the line pressure E owing to the pressure impressed on the coils by the condenser.

As previously stated, the rotation of the disk G does not increase proportionally as the load increases. This error is partially eliminated by the employment of the laminated metal return plate $E^3$ for the magnetic lines owing to there being less eddy currents than when the return plate is made of soft steel or cast iron. The remaining error is corrected by the inductive resistance located in shunt with the disk G which serves to shunt more of the current when the load is light and gradually increases in reactance as the load increases thereby sending a greater proportion of the current through the disk and consequently increasing its speed of rotation. The reactive resistance through the inductive shunt should increase as the load increases in proportion to the normal tendency of the speed of the disk to relatively fall behind the increase in load. The inductive resistance is preferably such as indicated in Fig. 1 in which all of the load current passes through the primary energizing turns around the core $n'$ so that on light load the primary coil has very little effect on the inductive shunt through the lead $n$, but on full load the primary coil has a very great effect on the inductive resistance in the shunt by introducing into the coil of the resistance a counter E. M. F. sufficient to cause practically infinite resistance through the shunt so that nearly all of the current passes through the disk thereby resulting in maximum rotative torque at full load, whereas on light load the effect of the primary winding is so slight upon the inductive shunt that only about one-half of the total current at that load passes through the disk G.

It is obviously a simple matter to so adjust the relative primary and secondary coils in the shunting device just described as to compensate for the normal tendency of the disk to relatively fall behind in its speed of rotation as the load increases. The non-inductive resistance $r$ serves to insure the passing of a portion of the current across the shunt $n$ on light load.

The presence of the air gaps $o'$ and $o^2$ in the magnetic circuit of the shunting device is of importance inasmuch as in a closed magnetic circuit the effect of the shunting device will not increase properly with the increasing load, as on very light load the magnetism will be lower in proportion for the magnetizing force than on heavier loads. This is due to the fact that the magnetism of soft iron initially increases very slowly with the magnetizing force and consequently by introducing an air gap in the magnetic circuit of the shunting device enough primary turns can be employed to initially magnetize the coil sufficiently for the lightest loads which the meter must measure, and the magnetization will then increase up to the highest load which the meter is adapted to measure.

In lieu of the inductive resistance above described, which is preferably employed, I may use an inductive resistance such as indicated in Fig. 2, consisting in a choke coil in the shunt $n$ and the yoke $n^2$ which owing to the presence of the non-inductive resistance $r$ carries approximately half of the current around the disk on light load, but as the load increases the reactance increases, thereby sending through the disk a greater proportion of the main current as the load increases.

What I claim as new and desire to secure by Letters Patent is:—

1. The method of operating a mercury motor watt-meter on alternating current which consists in bringing the current in the pressure circuit into phase with the impressed electro-motive force.

2. The method of operating mercury motor watt-meters on alternating current which consists in bringing the magnetic effect of the current of the pressure circuit into zero phase relation with the impressed electromotive force.

3. The method of operating by an alternating current a mercury watt motor meter which consists in directing the alternating current to be measured, or an aliquot portion thereof, through the motor element of the meter, and in energizing the magnetic field by an alternating current of the same frequency as the load current, and by bringing said energizing current into zero phase relation with the impressed electro-motive force

ROBERT C. LANPHIER.

Witnesses:
J. H. HODDE,
A. D. BRINKERHOFF.